US011268875B2

(12) United States Patent
Hawkins et al.

(10) Patent No.: US 11,268,875 B2
(45) Date of Patent: Mar. 8, 2022

(54) METHOD AND APPARATUS FOR FLUID LEAK DETECTION

(71) Applicant: REDLINE DETECTION, LLC, Orange, CA (US)

(72) Inventors: Mark C. Hawkins, Fullerton, CA (US); Zachary M. Parker, Newport Coast, CA (US)

(73) Assignee: REDLINE DETECTION, LLC, Orange, CA (US)

( * ) Notice: Subject to any disclaimer, the term of this patent is extended or adjusted under 35 U.S.C. 154(b) by 225 days.

(21) Appl. No.: 15/819,101

(22) Filed: Nov. 21, 2017

(65) Prior Publication Data

US 2018/0143096 A1 May 24, 2018

Related U.S. Application Data

(60) Provisional application No. 62/425,540, filed on Nov. 22, 2016.

(51) Int. Cl.
*G01M 3/04* (2006.01)
*F22B 3/02* (2006.01)
*G01M 3/20* (2006.01)
*G01M 3/40* (2006.01)
*C25B 1/04* (2021.01)
*C25B 9/73* (2021.01)

(52) U.S. Cl.
CPC ............... *G01M 3/04* (2013.01); *C25B 1/04* (2013.01); *C25B 9/73* (2021.01); *F22B 3/02* (2013.01); *G01M 3/205* (2013.01); *G01M 3/40* (2013.01); *Y02E 60/36* (2013.01)

(58) Field of Classification Search
CPC .................................. G01M 3/04; G01M 3/20
See application file for complete search history.

(56) References Cited

U.S. PATENT DOCUMENTS

| 1,506,418 A | 8/1924 | Evensta et al. |
| 1,510,212 A | 9/1924 | Du Bois |
| 1,710,439 A | 9/1926 | Taylor |

(Continued)

FOREIGN PATENT DOCUMENTS

| DE | 4411928 | 1/1995 |
| GB | 640266 | 7/1950 |

(Continued)

OTHER PUBLICATIONS

Machine translation of JP 2018-65073 A.*

(Continued)

*Primary Examiner* — Nathaniel J Kolb
(74) *Attorney, Agent, or Firm* — Stetina Brunda Garred & Brucker

(57) ABSTRACT

Provided is a method of testing for a leak in a fluid system. The method includes submerging at least a portion of an electrically conductive body in an electrolyte solution, with the electrically conductive body and electrolyte solution being in an internal chamber of a device. The method further includes directing an electrical signal to the electrically conductive body, causing a reaction between the electrically conductive body and the electrolyte solution to produce hydrogen. The method further includes injecting the hydrogen into the fluid system for leak detection.

18 Claims, 4 Drawing Sheets

(56) References Cited

U.S. PATENT DOCUMENTS

| | | |
|---|---|---|
| 2,192,155 A | 4/1937 | Schuldt |
| 2,299,116 A | 5/1941 | Svirsky |
| 2,273,984 A | 2/1942 | Osborn |
| 2,753,876 A | 3/1955 | Kurt |
| 2,764,243 A | 9/1956 | Page |
| 3,024,200 A | 3/1962 | Smith |
| 3,075,535 A | 1/1963 | Lasting |
| 3,129,726 A | 4/1964 | Moore |
| 3,234,357 A | 2/1966 | Seuthe |
| 3,431,945 A | 3/1969 | Robillard |
| 3,431,946 A | 3/1969 | Sawyer |
| 3,583,239 A | 6/1971 | Paine |
| 3,837,214 A | 9/1974 | Guest |
| 3,870,085 A | 3/1975 | Schneider |
| 4,339,324 A * | 7/1982 | Haas ................... C25B 9/77 204/270 |
| 4,352,515 A | 10/1982 | Schumacher |
| 4,354,515 A | 10/1982 | Sutherland |
| 4,373,381 A | 2/1983 | Kulp et al. |
| 4,373,767 A | 2/1983 | Cairns |
| 4,460,019 A | 7/1984 | Condon |
| 4,524,607 A | 6/1985 | Pelletier et al. |
| 4,550,751 A | 11/1985 | Shimamura |
| 4,608,858 A | 9/1986 | McKinnon |
| 4,750,525 A | 6/1988 | Vaughn |
| 4,764,660 A | 8/1988 | Swiatosz |
| 4,818,843 A | 4/1989 | Swiatosz |
| 4,887,931 A | 12/1989 | Frisby et al. |
| 4,905,931 A | 3/1990 | Covey |
| 5,022,435 A | 6/1991 | Jaw-Shiunn |
| 5,107,698 A | 4/1992 | Gilliam |
| 5,328,152 A | 6/1994 | Castle |
| 5,353,842 A | 10/1994 | Lundman |
| 5,425,266 A | 1/1995 | Fournier |
| 5,390,738 A | 2/1995 | Eslinger et al. |
| 5,501,115 A | 3/1996 | Kamiyama et al. |
| 5,647,054 A | 7/1997 | Jones |
| 5,735,955 A | 4/1998 | Monaghan et al. |
| 5,771,937 A | 6/1998 | Collins |
| 5,859,363 A | 1/1999 | Gouge |
| 5,922,944 A | 7/1999 | Pieroni et al. |
| 6,018,615 A | 1/2000 | Loblick |
| 6,116,286 A | 9/2000 | Hooper |
| 6,131,441 A | 10/2000 | Berube et al. |
| 6,142,009 A | 11/2000 | Loblick |
| 6,175,987 B1 | 1/2001 | Harvey |
| 6,267,001 B1 | 7/2001 | Duncan |
| 6,314,795 B1 | 11/2001 | Ingham |
| 6,336,482 B1 | 1/2002 | Cunkle et al. |
| 6,348,869 B1 | 2/2002 | Ashworth |
| 6,351,985 B1 | 3/2002 | Bedwell |
| 6,361,752 B1 | 3/2002 | Demarest et al. |
| 6,389,613 B1 | 5/2002 | Comas |
| 6,392,227 B1 | 5/2002 | Banyard et al. |
| 6,439,031 B1 | 8/2002 | Pieroni et al. |
| 6,481,465 B1 | 11/2002 | Warmerdam |
| 6,502,603 B2 | 1/2003 | Lane, Jr. |
| 6,526,808 B1 | 3/2003 | Pieroni et al. |
| 6,651,486 B1 | 11/2003 | Johnson et al. |
| RE38,686 E | 1/2005 | Loblick |
| 6,899,138 B2 | 5/2005 | Lundman |
| 6,907,771 B2 | 6/2005 | Finlay et al. |
| 7,013,926 B1 | 3/2006 | Storey |
| 7,305,176 B1 | 12/2007 | Pieroni |
| 7,597,118 B1 | 10/2009 | Peterson et al. |
| 8,256,467 B1 | 9/2012 | Larson et al. |
| 2001/0035046 A1 | 11/2001 | Williams |
| 2002/0152801 A1 | 10/2002 | Burke et al. |
| 2003/0047881 A1 | 2/2003 | Worm et al. |
| 2004/0126889 A1 * | 7/2004 | Puri ................... G01M 3/20 436/3 |
| 2004/0173006 A1 * | 9/2004 | McCoy ............... G01M 3/229 73/40.7 |
| 2007/0079649 A1 | 12/2007 | Nauseda et al. |
| 2007/0297774 A1 | 12/2007 | Pieroni |
| 2009/0277800 A1 * | 11/2009 | Grimes ................ B01J 8/025 205/637 |
| 2009/0315326 A1 | 12/2009 | Pieroni |
| 2010/0095746 A1 | 4/2010 | Lund |
| 2012/0201522 A1 | 8/2012 | Stauffer |
| 2013/0247651 A1 | 9/2013 | Grange |
| 2013/0319540 A1 | 12/2013 | Hegner |
| 2014/0083168 A1 | 3/2014 | Parker et al. |
| 2014/0378745 A1 * | 12/2014 | Lin ................... A61M 21/02 600/27 |
| 2019/0232235 A1 * | 8/2019 | Takahashi ............ B01D 53/229 |

FOREIGN PATENT DOCUMENTS

| | | |
|---|---|---|
| GB | 1039729 | 8/1966 |
| GB | 1240867 | 7/1971 |
| JP | S56110032 | 9/1981 |
| JP | 59126223 | 7/1984 |
| JP | 59138935 | 8/1984 |
| JP | 2003004581 | 1/2003 |
| JP | 2018-65073 A * | 4/2018 ............ B01F 3/02 |
| WO | 2015171821 | 11/2015 |

OTHER PUBLICATIONS

Copenheaver, Blaine R.; Patent Cooperation Treaty International Search Report; PCT/US2017/063055; Feb. 5, 2018; 11 pages.

Intake Pressure Testers for the Turbocharged Mitsubishi 3000GT/Dodge Stealth; http://www.stealth316.com/2-pressuretester.htm. Retrieved via Internet Archive. Dated Feb. 16, 2007.

DSM Boost Leaks/Turbo intake Pressure Tester; http://www.mirage-performance.com/EclipseGSX/BoostLeaks/index.html, Retrieved via Internet Archive. Dated Feb. 8, 2007.

Patent Cooperation Treaty International Search Report; PCT/US20103060732; dated Feb. 11, 2014; 5 pages.

European Patent Office Extended Search Report; 13841836.1-1557/2901066; 3 pages.

* cited by examiner

METHOD AND APPARATUS FOR FLUID LEAK DETECTION

CROSS-REFERENCE TO RELATED APPLICATIONS

This application claims priority to U.S. Provisional Application No. 62/425,540 filed Nov. 22, 2016, the contents of which are expressly incorporated herein by reference.

STATEMENT RE: FEDERALLY SPONSORED RESEARCH/DEVELOPMENT

Not Applicable

BACKGROUND

1. Technical Field

The present disclosure relates generally to leak detection devices and methods, and more specifically to devices and methods associated with generating a detection media used for leak detection in a fluid system.

2. Description of the Related Art

When testing the fluid integrity of a given fluid system, it is common to inject visual vapor or smoke into the system under pressure. If the visual vapor or smoke can be observed escaping from the fluid system, the fluid integrity of the system may be compromised, due to the presence of a leak.

The visual vapor or smoke may be produced by heating mineral oil within a chamber to vaporize the mineral oil. In order to achieve a desired result, precise heating temperatures for the mineral oil may be required. The magnitude of the heating temperature may vary depending on the test pressure. For instance, a test pressure of 80 PSI may require a heating temperature within the chamber of 75-80 degrees Celsius to produce optimum production of vapor.

Due to the strict relationship between temperature and pressure, there may be an initial delay in the production of vapor, with such delay being attributable to preheating of the chamber in which the mineral oil resides. In some instances, the preheating delay could be as long as 8-12 minutes, depending on several factors such as ambient air temperature, compressed air temperature, flow rate of compressed air through the chamber, input voltage to the heating element, amount of mineral oil in the chamber, and the materials used to construct the chamber. Also, if cold air is running through the chamber, the cold air may cool the heater, thereby making the heater less effective. When the proper warm up cycle is achieved, the optimum amount of detectable signature vapor may be produced for the desired compressed air test pressure.

However, proper warm up may require certain levels of precision. For instance, when the vapor production chamber is overheated, preheated too quickly or not thermostatically controlled, "dieseling" may occur, which is a phenomenon of vapor production chamber spontaneous combustion. Dieseling may also occur should hot air from a nearby compressor reach the chamber and lead to the chamber overheating. While dieseling may not be harmful to the vapor generating machine or the surrounding environment, dieseling may inhibit the production of optimum testing vapor.

Furthermore, even if the mineral oil is vaporized under proper conditions, there may be limitations as to the use of the vaporized mineral oil for visual identification of leaks. When system leaks are very small or microscopic, the oil particles that are vaporized to make visual vapor may not be able to get through a leak to allow for visual inspection. Additionally, when pressures are much higher such as 30 PSI up to 175 PSI the vapor may not be visible because it is being transmitted through a leak point with such force it dissipates before it can be identified visually.

Therefore, using a trace gas in conjunction with a gas detector (sniffer) can be a much more effective method of detecting and locating tiny leak as well as high pressure leaks. While the process of creating visual vapor may also create some hydrogen there are several factors that can complicate a leak detection process. First, if one uses a typical capillary device such as fiberglass with wicking properties, the higher pressures and temperatures may cause dieseling in the smoke chamber that is exacerbated by the tiny fiberglass fibers.

In view of the variety of factors that could delay the production of testing vapor, there is a need in the art for an improved device and method for generating a leak detection media. Various aspects of the present disclosure address this particular need, as will be discussed in more detail below.

BRIEF SUMMARY

Various aspects of the present disclosure are directed toward improvements in generating testing media for leak detection. Along these lines, one particular aspect of the present disclosure is directed toward generating hydrogen through electrolysis, wherein the hydrogen may be used as a tracer gas for leak detection. Another aspect of the present disclosure relates to a porous capillary device and a heating device located internal to the capillary device for vaporizing mineral oil.

In accordance with one embodiment of the present disclosure, there is provided a method of testing for a leak in a fluid system. The method includes submerging at least a portion of an electrically conductive body in an electrolyte solution, with the electrically conductive body and electrolyte solution being in an internal chamber of a device. The method further includes directing an electrical signal to the electrically conductive body, causing a reaction between the electrically conductive body and the electrolyte solution to produce hydrogen. The method further includes injecting the hydrogen into the fluid system for leak detection.

The electrically conductive body may include a plurality of electrically conductive plates. The electrically conductive body may be formed from at least one of stainless steel, ruthenium, rhodium, iridium, copper, carbon, silver, gold, titanium, platinum, nickel, cobalt, copper, iron, and aluminum.

The submerging step may include submerging at least a portion of the electrically conductive body in an electrolyte solution having a pH between 11.0-11.4.

The submerging step may include submerging at least a portion of the electrically conductive body in an electrolyte solution including distilled water. The submerging step may include submerging at least a portion of the electrically conductive body in an electrolyte solution including at least one of sodium bicarbonate, sodium hydrogen carbonate, and sulfuric acid.

The injecting step may include injecting hydrogen into the fluid system at a pressure greater than 135 PSI, or at a pressure greater than 150 PSI, or at a pressure between 150-200 PSI.

The hydrogen may be produced less than 8 minutes after directing the electrical signal to the electrically conductive body. Hydrogen may be produced less than 1 minute after directing the electrical signal to the electrically conductive body.

The temperature within the internal chamber during production of the hydrogen may be less than 75 degrees Celsius.

According to another aspect of the present disclosure, there is provided a smoke generating device for use with a vaporizing substance. The smoke generating device includes a housing defining an inner chamber configured to receive the vaporizing substance. A capillary device extends within the inner chamber of the housing, with the capillary device being formed from a porous material. The capillary device includes an interior void and is operative to allow fluid flow of the vaporizing substance through the capillary device to the interior void. A heating element is located within the interior void of the capillary device. An inlet conduit in fluid communication with the inner chamber and is fluidly connectable to a pressurized fluid source. An outlet conduit is in fluid communication with the inner chamber.

The capillary device may be formed from a ceramic material.

The heating element and the capillary device may be configured to generate vapor when the pressure within the inner chamber is 30 PSI.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

The detailed description set forth below in connection with the appended drawings is intended as a description of certain embodiments of generating leak detection media and is not intended to represent the only forms that may be developed or utilized. Various aspects of the present disclosure relate to a device and related method of quickly generating hydrogen for use in leak detection. The hydrogen may be generated through electrolysis using distilled water, with the hydrogen being mixed with a pressurized gas and subsequently injected into a fluid system for testing the integrity of the fluid system. A hydrogen sniffer may be used to determine whether hydrogen is leaking from the fluid system to help identify the presence of the leak. Generating hydrogen through electrolysis may be much quicker than conventional methods of generating testing media, which are typically associated with a warm-up period, which may be unnecessary with the electrolysis method. Furthermore, the use of electrolysis may allow for increased testing pressures.

It may be preferable to create a hydrogen trace gas without the possibility of combustion/dieseling by eliminate heating of the chamber whatsoever. Therefore, using an electrolysis process may produce desirable results especially when using higher pressures such as 30 PSI to 175 PSI. A properly calibrated electrolysis process produces very little heat and there may be nothing flammable inside the chamber to begin or sustain a dieseling/combustion process. Also, the electrolysis process may require very little time to produce hydrogen. Since creating hydrogen may be a primary objective, rather than a byproduct as with visual vapor machines, the quantity and quality of hydrogen created may be much greater. The hydrogen atom is the smallest atom, containing only one proton and one neutron. This is critical because hydrogen can advance through a fully pressurized system and pass through the leak point(s) to be detected by the sniffer.

If conducting leak testing using hydrogen, it is conceivable that one could use a compressed air cylinder full of hydrogen or some other trace gas to perform the testing. However, the challenge is that many of the systems being tested are large and if one is pressurizing the system under test to 150+ PSI then the gas is being used in large volumes which can become cost prohibitive. In contrast, the hydrogen generating device disclosed herein runs on compressed air such that other than the very slight usage of electrolyte solution, there are no consumables. Lastly there is the safety issue of properly transporting, using, and storing highly compressed air cylinders.

This process is ideally suited for testing the integrity of air brake systems such as those in heavy duty trucks. In addition, it can be used in air conditioning systems in motor vehicles, homes, as well as commercial and industrial buildings, or other systems known in the art.

Figure 1:
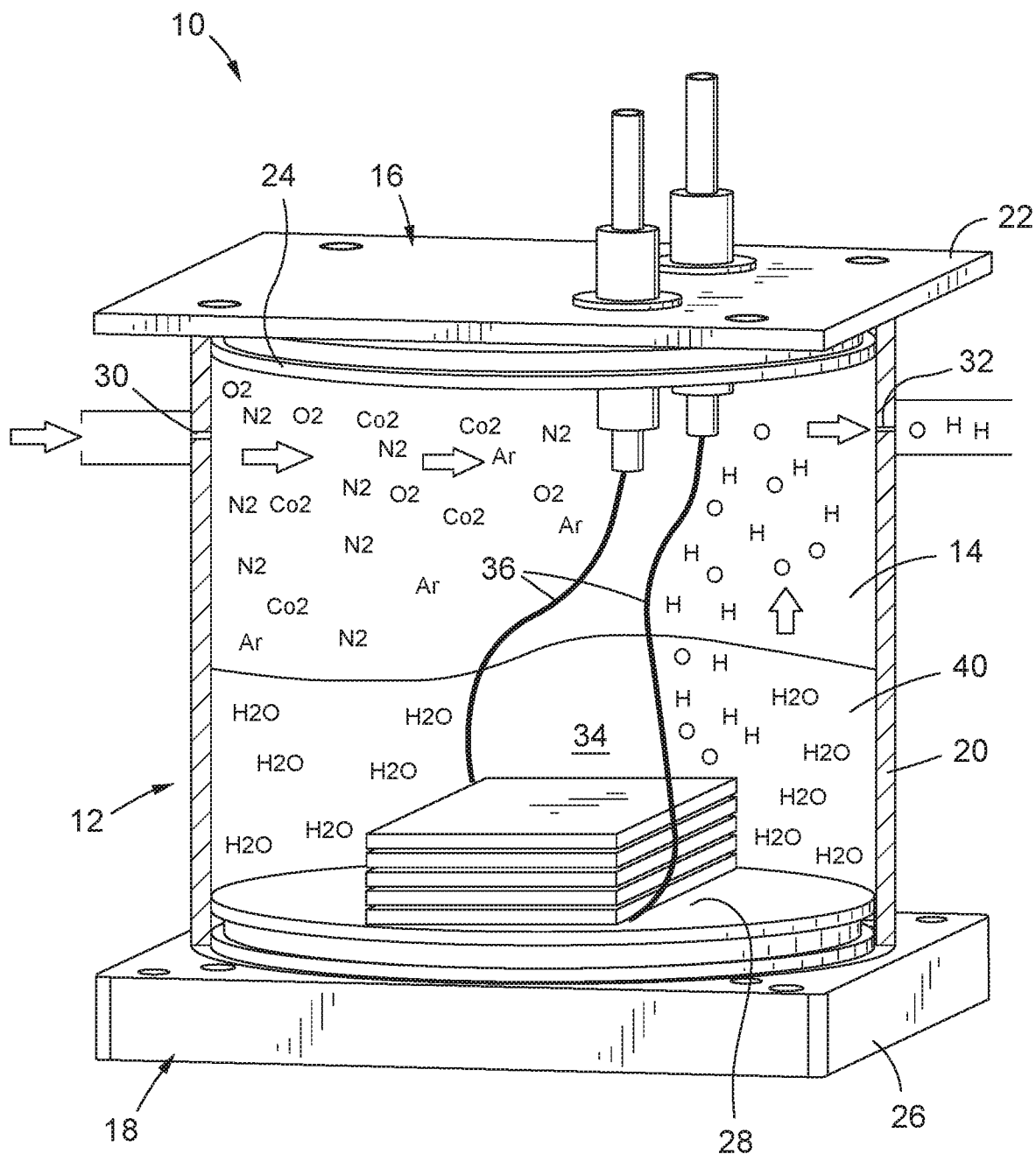
FIG. 1 is a cross sectional view of a generating device for generating hydrogen using electrolysis.

Referring now to FIG. 1, there is depicted a generating device 10 used to generate hydrogen and deliver the hydrogen to the fluid system for testing. The generating device 10 includes a housing 12 having an internal chamber 14. In the exemplary embodiment, the housing 12 is comprised of an upper body 16, a lower body 18, and a sidewall 20 extending between the upper body 16 and lower body 18. The housing 12 may be portable and capable of being transported to allow for leak testing in different locations or at different facilities.

The upper body 16 includes a quadrangular plate 22 and a circular element 24 extending from the quadrangular plate 22. The quadrangular plate 22 is sized and structured to extend radially outward from the circular element 24. The lower body 18 is configured similar to the upper body 16, with the lower body 18 including a quadrangular plate 26 and a circular element 28 extending from the quadrangular plate 26. The sidewall 20 may be in the form of a generally cylindrical sleeve, which receives the circular elements 24, 28 therein, and engages with the circular elements 24, 28 to create a fluid tight seal between the sidewall 20 and the circular elements 24, 28. In this respect, the internal chamber 14 may be collectively defined by the circular elements 24, 28 and the sidewall 20. Seals, gaskets, o-rings, or the like may be used between the circular elements 24, 28 and the sidewall 20 to strengthen any fluid tight seal therebetween.

The sidewall 20 may include an inlet opening 30 and an outlet opening 32 formed therein, with the inlet opening 30 being fluidly connectable with a source of pressurized fluid, and the outlet opening 32 being fluidly connectable to the fluid system that is to be tested. In this respect, the pressurized fluid may be received into the internal chamber 14 through the inlet opening 30, and mixed with the hydrogen generated within the internal chamber 14. Subsequently, the pressurized mixture may flow through the outlet opening 32 and into the fluid system for leak detection.

Although the upper body 16 and lower body 18 in the exemplary embodiment include quadrangular plates 22, 26 and circular elements 24, 28, it is understood that the shape and configuration of the upper and lower bodies 16, 18 is not limited thereto. In this respect, the upper and lower bodies 16, 18 may be a variety of different shapes and sizes without departing from the spirit and scope of the present disclosure. Likewise, the sidewall 20 is not limited to having a circular cross sectional configuration. Rather, it is contemplated that the sidewall 20 may formed in other shapes.

The generating device 10 additionally includes a plurality of electrically conductive bodies 34 located within the internal chamber 14. As shown in FIG. 1, the electrically conductive bodies 34 include a plurality of electrically conductive plates, which are placed on the circular element 28 of the lower body 18. Five electrically conductive plates 34 are included in the exemplary embodiment. The plates 34 may be spaced from each other and arranged in an array. The spacing of the plates 34 allows at least a portion of the plates 34 to be bathed or submerged in an electrolyte solution, as will be described in more detail below. The plates 34 may be formed from or at least partially include stainless steel, ruthenium, rhodium, iridium, copper, carbon silver, gold titanium, platinum, nickel, cobalt, copper, iron, or aluminum. The plates 34 may also be coated in platinum, palladium, gold or silver. The foregoing materials are provided as examples, and thus, other materials known in the art may also be used without departing from the spirit and scope of the present disclosure. Furthermore, although five electrically conductive plates 34 are shown in FIG. 1, it is understood that fewer than five electrically conductive plates 34 may be used, or more than five electrically conductive plates 34 may be used without departing from the spirit and scope of the present disclosure.

The plates 34 are connected to wires 36 or leads, which may be connected to a power supply. In this respect, the wires deliver the electrical voltage from the power supply to the plates 34. The wires 36 may extend within respective conduits 38, which pass through the upper body 16.

With the basic structure of the generating device 10 described above, the following description relates to an exemplary use of the generating device 10. The device 10 is prepared for use by at least partially submerging the plates 34 in an electrolyte solution 40, however, it may be preferable to completely submerge the plates 34 within the solution. The electrolyte solution 40 may include distilled water with a very low concentration of sodium bicarbonate (e.g., baking soda), sulfuric acid, sodium hydrogen carbonate, sodium hydroxide, a potassium hydroxide (KOH) solution, or substances known by those skilled in the art. For stainless steel or iron plates/electrodes 34, the electrolyte solution 40 is preferably at a pH of between 11.0 and 11.4, and more preferably equal to 11.2.

An electrical signal, e.g., voltage, is directed to the electrically conductive plates 34, which then communicates the voltage to the solution 40. When the voltage is applied to the solution 40, the element bonds of the elements forming the solution 40 are broken to produce the hydrogen. The temperature of the internal chamber 14 during production of hydrogen may be room temperature.

A source of pressurized gas, such as compressed air (e.g., $N_2$, $O_2$, Ar, $CO_2$), may be connected to the inlet opening 30 to allow the pressurized gas to flow into the internal chamber 14. The pressurized gas may mix with the hydrogen produced through the electrolysis. The combination of the pressurized gas and the hydrogen may exit the internal chamber 14 through the outlet opening 32 for delivery to the fluid system under test. In this regard, by generating the hydrogen at the time of performing the leak test, storage of pressurized hydrogen or other commonly used trace gases may not be required. Thus, the generating device 10 may not be subject to rules and regulations that may be applicable when storing other compressed gases.

Figure 2:
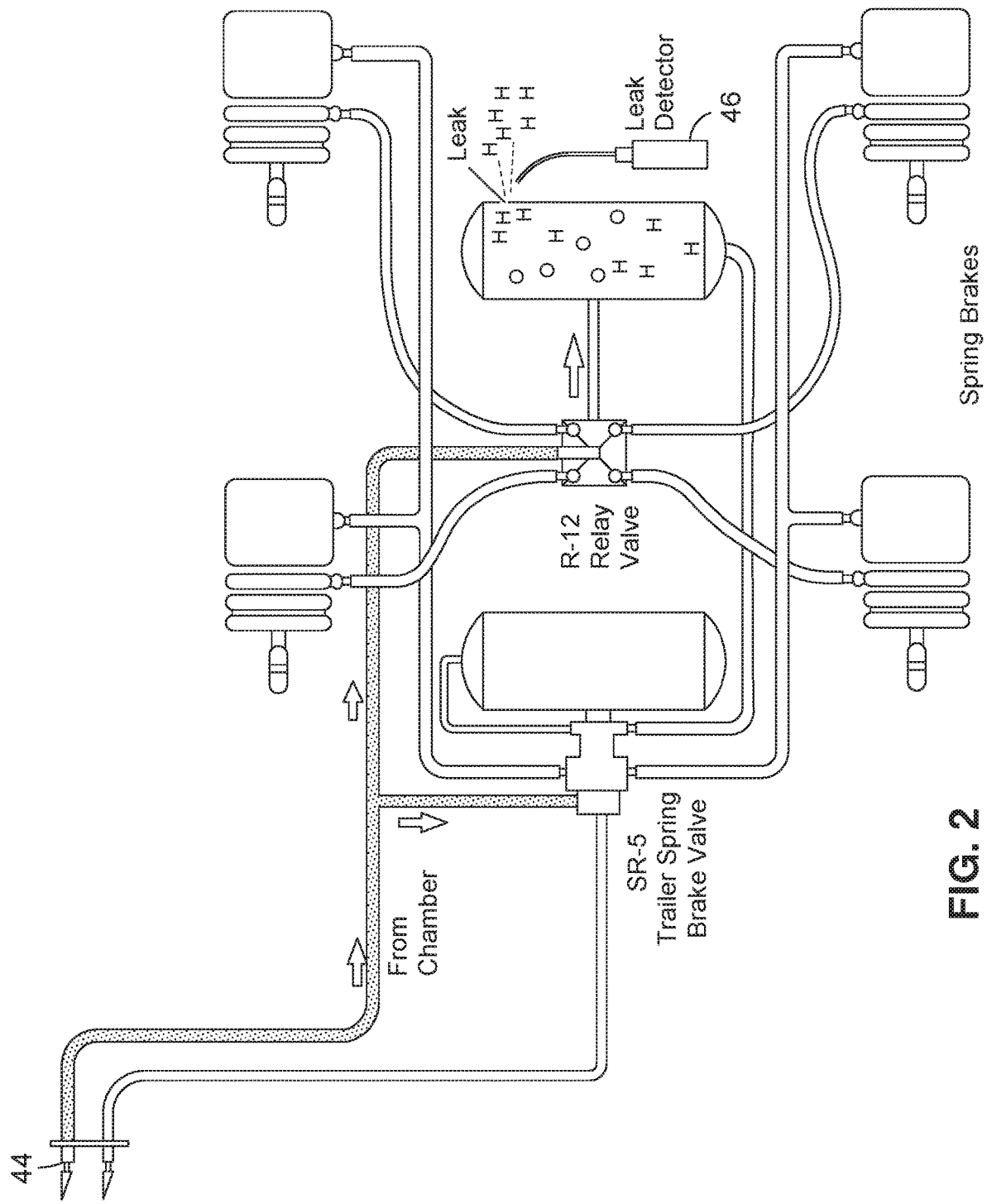
FIG. 2 is a schematic view of a fluid system injected with hydrogen for detecting a leak in the fluid system.

Referring now to FIG. 2, a brake system for a vehicle is provided as an exemplary fluid system 42, which is tested for leaks. Pressurized fluid, including hydrogen generated from the generating device 10, is injected into the fluid system 44 through entry port 44. After the pressurized fluid is injected into the fluid system 42, a hydrogen sniffer 46 or other leak detector may be used to detect the presence of hydrogen. If there is a leak, the hydrogen will likely escape from the fluid system 42 through the leak, and thus, if the hydrogen sniffer detects a trace of hydrogen, there is likely a leak. Conversely, if there is no leak, hydrogen may be contained within the fluid system 42, and thus, the sniffer 46 would likely not detect the presence of hydrogen. For more information regarding the use of a hydrogen sniffer or other leak detector to detect the presence of a leak, please refer to United States Patent Application Publication No. 2017/0023433, entitled System and Method for Detecting Microscopic Leaks, the contents of which are expressly incorporated herein by reference.

Although FIG. 2 shows leak testing in a brake system, it is understood that the use of the generating device 10 is not limited thereto. In particular, the generating device 10 may be used to detect leaks in air conditioning systems or other fluid systems known by those skilled in the art.

The use of electrical voltage for separating element bonding by way of electrolysis, rather than using electrical voltage to heat mineral oil may provide several benefits. One benefit is that electrolysis lessens or completely eliminates the warm up period required to achieve proper signature vapor concentration levels. The use of electrolysis also lessens or eliminates dieseling. Furthermore, because electrolysis uses electricity to break element bonds, rather than the generate heat, hydrogen may be generated through electrolysis at much higher pressures. In some instances, the pressure can exceed 200 PSI, whereas conventional oil machines which generate vapor by heating mineral oil begin to lose some utility and effectiveness over 135-150 PSI.

Although the use of electrolysis to generate hydrogen provides several benefits over the conventional method of heating mineral oil, there may be times in which the oil based method may be preferred. For instance, oil may be preferred when detecting leaks in an air conditioning system, wherein the only generally accepted substance would be polyalkylene glycol (PAG) oil. Furthermore, a preference for an electrolysis chamber design or a mineral oil chamber design may also be based on the environmental conditions such as ambient air temperatures, equipment operating pressures, or equipment operating temperatures in which the testing is performed. It may be determined to be detrimental to the equipment under test to have any residual moisture or waste elements from the mineral oil or from the distilled water solution. This residual moisture or waste elements could be considered a contaminant to their respective internal environments. Depending on the leaks being searched for, on the equipment under test, in the environment in which the equipment is being used, an option of signature vapor production variation may be required. As such, both signature vapor production chamber designs (e.g., an electrolysis based design and a heated mineral oil based design) may be needed to cover a wide variety of internal testing environments and outside environmental test conditions. For a more general discussion regarding the use of mineral oil in generating a leak detection media, please refer to U.S. Pat. No. 8,737,826 B2, entitled High Pressure Smoke Machine, the contents of which are expressly incorporated herein by reference.

Figure 3:
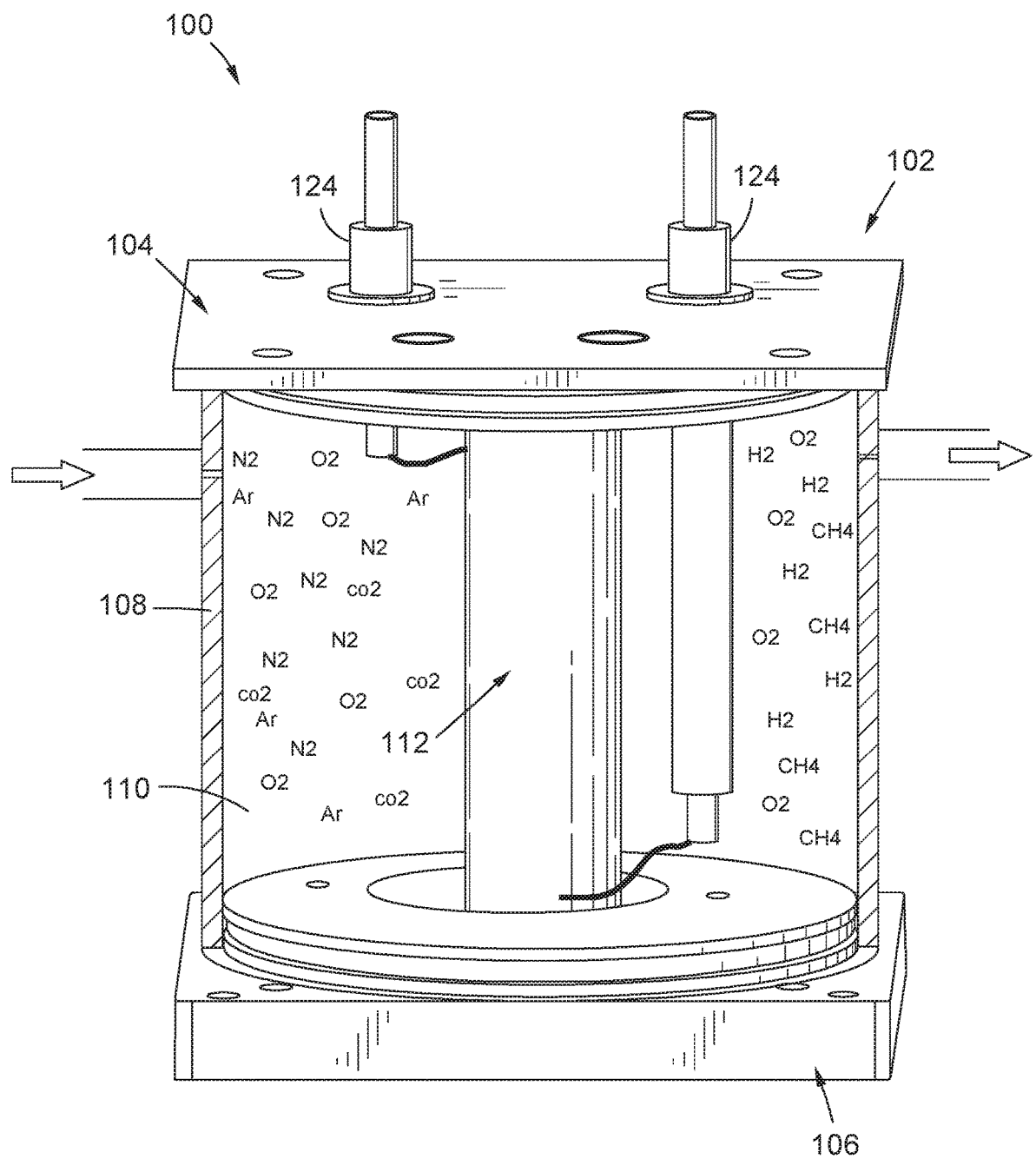
FIG. 3 is an upper perspective cross sectional view of an embodiment of a vapor generating device taken in a first cross sectional plane.
Figure 4:
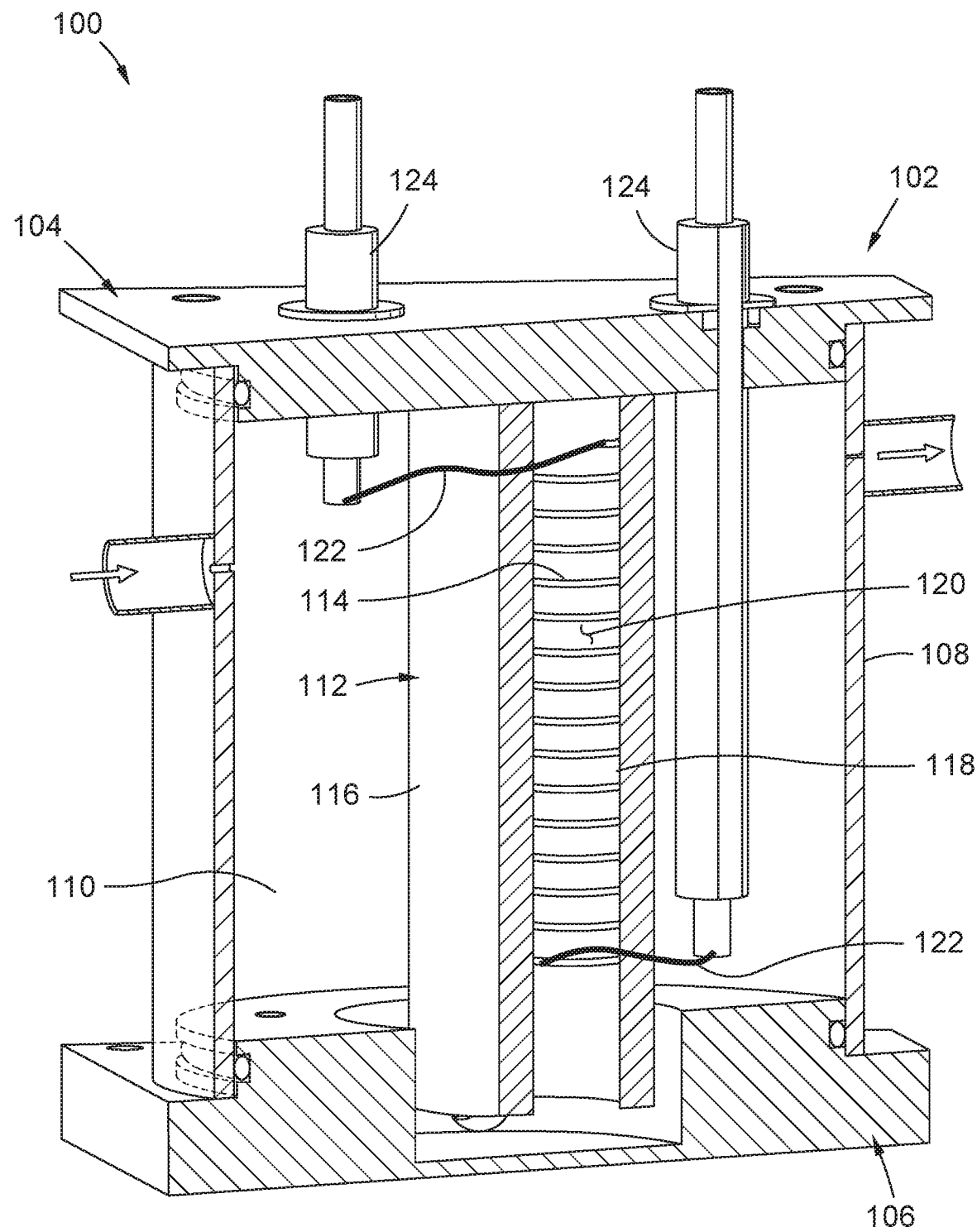
FIG. 4 is a perspective cross sectional view of the vapor generating device of FIG. 3, with the cross section being taken in a second cross sectional plane.

Accordingly, referring now specifically to FIGS. 3 and 4, an embodiment of smoke generating device 100 is shown, with such smoke generating device 100 being specifically adapted to generate the smoke through heated mineral oil. The smoke generating device 100 includes a housing 102 having an architecture that is similar to the housing 12 discussed above. In particular, the housing 100 includes an upper body 104, a lower body 106, and a sidewall 108 extending between the upper body 104 and lower body 106. The housing 100 includes an internal chamber 110 which receives a vaporizing substance, such as mineral oil, which may be heated to create the smoke for fluid testing.

The smoke generating device 100 further includes a capillary device 112 and a heating element 114 located within the internal chamber 110. The specific arrangement of the capillary device 112 and heating element 114 provide several benefits, particularly when compared to conventional oil based generators, as will be described in more detail below.

The capillary device 112 conveys the vaporizing substance, e.g., mineral oil residing in the internal chamber 110, to the heating element 114 for vaporization. According to one embodiment, the capillary device 112 is a cylindrical structure having an outer surface 116 and an inner surface 118 defining an inner void 120. The capillary device 112 may be formed from a porous material to allow the vaporizing substance to travel therethrough to reach the heating element 114. For instance, the capillary device 112 may be formed of bonded silica, ceramic, stone, alumina, alumina ceramic, porous alumina, or other materials known in the art.

The heating element 114 may include an electrical wire, or coil that is wound within the inner void 120 of capillary device 112. The heating element 114 is connected to two electrical leads or wires 122, which are connected to an electrical power supply. The wires 122 may extend through respective conduits 124 passing through the upper body 104.

The location of the heating element 114 within the inner void 120 of the capillary device 112 may be associated with several benefits. In particular, such benefits may be attributable from shielding the heating element 114 away from the air rushing into the internal chamber 110. One benefit is that the internal location of the heating coil 114 prevents cold air from striking the coil 114 and cooling at least a portion of the coil 114. Furthermore, shielding the coil 114 from cool, incoming air also protects against one section of the coil 114 from becoming cold in response to such contact. Should even a small section of the coil 114 become cold, it may throw off the resistance readings thereby interfering with a microprocessor/controller which may overcompensate by adding too much power and creating a hot spot on the other parts of the resistance wire heating coil 114 leading to potential dieseling. The internal location of the heating coil 114 also beneficially maintains the resistance wire heating coil 114 away from the oil spray and oxygen.

The use of a porous ceramic capillary device 112 with a tightly wound heating coil 14 inside of the capillary device 112 greatly reduces the propensity to diesel. Along these lines, previous smoke generating devices typically utilized a fiberglass type capillary device, which may include errant strands of micro-fibers which can become a source of dieseling with the right combination of heat, oil, oxygen and pressure. Therefore, particularly on higher pressure applications, it may be preferable to use a hard porous capillary device 112, as opposed to the conventional fiberglass type capillary devices. The construction of the capillary device 112 along with the internally located heating coil 114 allows for increased heat and pressure in the internal chamber 110. Use of a ceramic or stone capillary device (wick) may eliminate the presence of any fibers of fiberglass that can become a catalyst for combustion/dieseling. Also, wrapping the ceramic or stone capillary device with a resistance wire heating element may also be a source for dieseling such that an internal heating element that is located inside the capillary device will produce better results.

The particulars shown herein are by way of example only for purposes of illustrative discussion, and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A method of testing for a leak in a fluid system, the method comprising the steps of:

submerging at least a portion of an electrically conductive body in an electrolyte solution, the electrically conductive body and electrolyte solution being in an internal chamber of a device having a fluid inlet and a fluid outlet;

directing an electrical signal to the electrically conductive body causing a reaction between the electrically conductive body and the electrolyte solution to produce hydrogen;

receiving a pressurized fluid in the internal chamber via the fluid inlet of the internal chamber subsequent to the directing step and while the hydrogen remains in the internal chamber;

mixing the pressurized fluid with the produced hydrogen to produce a resultant mixture suitable for use in leak detection, the mixing occurring in the internal chamber prior to the produced hydrogen leaving the internal chamber;

injecting the resultant mixture into the fluid system via the fluid outlet of the internal chamber for testing for a leak; and testing for a leak in the fluid system by sensing whether hydrogen from the resultant mixture is leaking from the fluid system.

2. The method recited in claim 1, wherein the electrically conductive body in the submerging and directing steps includes a plurality of electrically conductive plates.

3. The method recited in claim 1, wherein the electrically conductive body in the submerging and directing steps is formed from at least one of stainless steel, ruthenium, rhodium, iridium, copper, carbon, silver, gold, titanium, platinum, nickel, cobalt, copper, iron, and aluminum.

4. The method recited in claim 1, wherein the submerging step includes submerging at least a portion of the electrically conductive body in an electrolyte solution having a pH between 11.0-11.4.

5. The method recited in claim 1, wherein the submerging step includes submerging at least a portion of the electrically conductive body in an electrolyte solution including distilled water.

6. The method recited in claim 5, wherein the submerging step includes submerging at least a portion of the electrically conductive body in an electrolyte solution including at least one of sodium bicarbonate, sodium hydrogen carbonate, and sulfuric acid.

7. The method recited in claim 1, wherein the injecting step includes injecting hydrogen into the fluid system at a pressure greater than 135 PSI.

8. The method recited in claim 1, wherein the injecting step includes injecting hydrogen into the fluid system at a pressure greater than 150 PSI.

9. The method recited in claim 1, wherein the injecting step includes injecting hydrogen into the fluid system at a pressure between 150-200 PSI.

10. The method recited in claim 1, wherein the hydrogen is produced less than 8 minutes after directing the electrical signal to the electrically conductive body.

11. The method recited in claim 1, wherein the hydrogen is produced less than 1 minute after directing the electrical signal to the electrically conductive body.

12. The method recited in claim 1, wherein a temperature within the internal chamber during production of the hydrogen is less than 75 degrees Celsius.

13. A method of testing a fluid system for leaks, the method comprising the steps of:
   directing an electrical signal to an electrically conductive body in fluid contact with an electrolyte solution within an internal chamber of a device, the internal chamber having a fluid inlet, a fluid outlet, and a temperature less than 75 degrees Celsius;
   producing hydrogen within 1 minute of directing the electrical signal to the electrically conductive body, the hydrogen being produced as a result of a reaction between the electrically conductive body and the electrolyte solution;
   receiving a pressurized fluid in the internal chamber via the fluid inlet while the hydrogen remains in the internal chamber;
   mixing the pressurized fluid with the produced hydrogen to produce a resultant mixture suitable for use in leak detection, the mixing occurring in the internal chamber such that the produced hydrogen is mixed with the pressurized fluid in the internal chamber prior to the produced hydrogen leaving the internal chamber;
   injecting the hydrogen mixed with the pressurized fluid into the fluid system via the fluid outlet of the internal chamber for testing the fluid system for leaks; and
   testing the fluid system for a leak by sensing whether hydrogen is leaking from the fluid system.

14. The method recited in claim 13, wherein the injecting step includes injecting hydrogen into the fluid system at a pressure greater than 135 PSI.

15. The method recited in claim 13, wherein the injecting step includes injecting hydrogen into the fluid system at a pressure greater than 150 PSI.

16. The method recited in claim 13, wherein the injecting step includes injecting hydrogen into the fluid system at a pressure between 150-200 PSI.

17. The method recited in claim 13, wherein the electrolyte solution in the directing step has a pH between 11.0-11.4.

18. The method recited in claim 13, wherein the electrolyte solution in the directing step includes distilled water.

* * * * *